United States Patent
Boulos et al.

(12)

(10) Patent No.: US 6,208,634 B1
(45) Date of Patent: Mar. 27, 2001

(54) METHODS AND APPARATUS FOR CDMA WIRELESS CALL SETUP TIME/SERVICE NEGOTIATION OPTIMIZATION

(75) Inventors: Pierre Boulos; Ahmet Baltas, both of Ottawa (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/050,789

(22) Filed: Mar. 30, 1998

(51) Int. Cl.$^7$ ...................................................... H04J 13/00
(52) U.S. Cl. ............................................................ 370/342
(58) Field of Search ................................... 370/311, 347, 370/342, 389, 441, 442; 455/434, 426, 522, 550, 513, 450, 38.1, 422, 428, 432, 438, 439; 375/130, 140, 137; 340/825.44

(56) References Cited

U.S. PATENT DOCUMENTS 5,878,344 * 3/1999 Zicker ................................... 455/426
5,887,259 * 3/1999 Zicker et al. ......................... 455/434

* cited by examiner

*Primary Examiner*—Dang Ton
(74) *Attorney, Agent, or Firm*—Cobrin & Gittes

(57) ABSTRACT

Methods and apparatus for initiating calls between a mobile station and a base station in a wireless CDMA system wherein status request messages and status response messages are not required for the base station to determine alternate service options supported by the mobile stations are disclosed in accordance with the teachings of the present invention. The invention includes the mobile station transmitting an origination message to the base station wherein the origination message includes all service options supported by the mobile station. The invention also includes the situation where the base station sends a page message to the mobile station. The mobile station responds by determining whether the page message is intended therefor. If it is and if the mobile station is configured to receive mobile station terminated calls, the mobile station transmits a page response message to the base station which includes the service options supported by the mobile station.

17 Claims, 2 Drawing Sheets

| Field | Length (bits) |
|---|---|
| NUM_ALT_SERVICE_OPTIONS | 0-4 |
| ALT_SERVICE_OPTION | 0 or 16x NUM_ALT_SERVICE_OPTIONS |

FIG. 2

METHODS AND APPARATUS FOR CDMA WIRELESS CALL SETUP TIME/SERVICE NEGOTIATION OPTIMIZATION

FIELD OF THE INVENTION

The invention relates generally to the field of wireless communication systems and more particularly, to methods and apparatus for setting up a call in CDMA systems.

BACKGROUND OF THE INVENTION

For CDMA call setup, a base station and/or mobile switching station (for convenience we will refer to both/ either as the base station) should know the service options supported by a mobile station. In existing CDMA systems as defined in the IS-95 standard of the Telecommunications Industry Association and the Electronic Industries Association (TIA/EIA/IS-95), TSB74, and ANSI J-STD-008 the disclosures of which are incorporated herein by reference, the base station receives a preferred service option during call initiation, but any alternative service options supported by the mobile station must be requested at a later time. The base station sends a Status Request Message on the Paging channel and/or Traffic channel to get this additional information. The mobile station then responds by sending a status message. The magnitude of the time period for this exchange may be in the order of seconds which is an inordinate amount of time in electronics and is thus inefficient.

Accordingly there exists a need for a more efficient system and method of negotiating service options between a base station and a mobile station in CDMA systems.

There also exists a need for a CDMA system which eliminates the need for request and response negotiations between the base station and a mobile station to determine which service options are available to the mobile station.

Accordingly it is an object of the present invention to provide more efficient systems and methods of negotiating service options between a base station and a mobile station in a CDMA system.

It is another object of the present invention to provide a CDMA system which eliminates the need for request and response negotiations between the base station and a mobile station to determine which service options are available.

Another object of the present invention is to provide a CDMA system which transmits preferred and alternate service options supported by the base station during call initiation.

These and other objects of the invention will become apparent to those skilled in the art from the following description thereof.

SUMMARY OF THE INVENTION

In accordance with the teachings of the present invention, these and other objects may be accomplished by the present systems and methods of initiating a call in a wireless CDMA system. An embodiment of the present invention includes a method of initiating calls between a mobile station and a base station in a CDMA system wherein Status Request Messages and Status Response Messages are not required for the base station to determine alternate service options supported by the mobile station. In the method of this embodiment the mobile station generates an origination message including a field including a preferred service option supported by the mobile station and a different field including all service options supported by the mobile station. After the message is generated the mobile transmits the origination message to the base station.

In an exemplary embodiment of the invention, the method includes the base station sending a page message to the mobile station. The mobile station determines whether the page message is intended therefor. If it is, and if the mobile station is configured to receive mobile station terminated calls, the mobile station transmits a page response message to the base station. The page response message includes a preferred service option field and an all service option field.

In another embodiment of the invention, the system includes a wireless communication system configured to initiate calls between a mobile station and a base station wherein Status Request Messages and Status Response Messages are not required for the base station to determine alternative service options supported by the mobile station. The system includes means for generating an origination message which includes a preferred service option field and an all service options field. The system also includes at least one transmitter for transmitting the origination message generated by the message generating means.

Another embodiment of the invention includes a wireless communication system configured to initiate calls between a mobile station and a base station wherein Status Request Messages and Status Response Messages are not required for the base station to determine alternative service options supported by the mobile station. The system of this embodiment includes means associated with the base station for generating a page message. It also includes a transmitter associated with the base station, in electrical communication with the page message generating means and configured to transmit the page message. The system further includes a receiver associated with the mobile station which is configured to receive the page message; means for determining if the page message is intended for the mobile station; means for generating a page response message which is operative only if the determining means determines that the page message is intended for the mobile station. The page response message includes a preferred service option field and an all service option field. The system also includes a transmitter in electrical communication with the page response generating means and configured to transmit the page response message.

In another embodiment of the present invention, the system includes a wireless communication system configured to initiate calls between a mobile station and a base station wherein Status Request Messages and Status Response Messages are not required for the base station to determine alternative service options supported by the mobile station. In this embodiment, the invention includes a microprocessor associated with the base station and configured to generate a page message. It also includes a transmitter associated with the base station which is in electrical communication with the microprocessor and which is configured to transmit the page message. There is a receiver associated with the mobile station which is configured to receive the page message, and a microprocessor associated with the mobile station in electrical communication with the receiver and configured to determine if the page message is intended for the mobile station. The microprocessor is further configured to generate a page response message if it determines that the page message is intended for the base station. The page response message includes a preferred service option field and an all service options field. The mobile station includes a transmitter associated therewith which is in electrical communication with the microprocessor and which is configured to transmit the page response message.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which:

FIG. 2 depicts possible fields which could be added to the origination message and/or the page response message in accordance with the present invention;

DETAILED DESCRIPTION OF THE INVENTION

Figure 1:
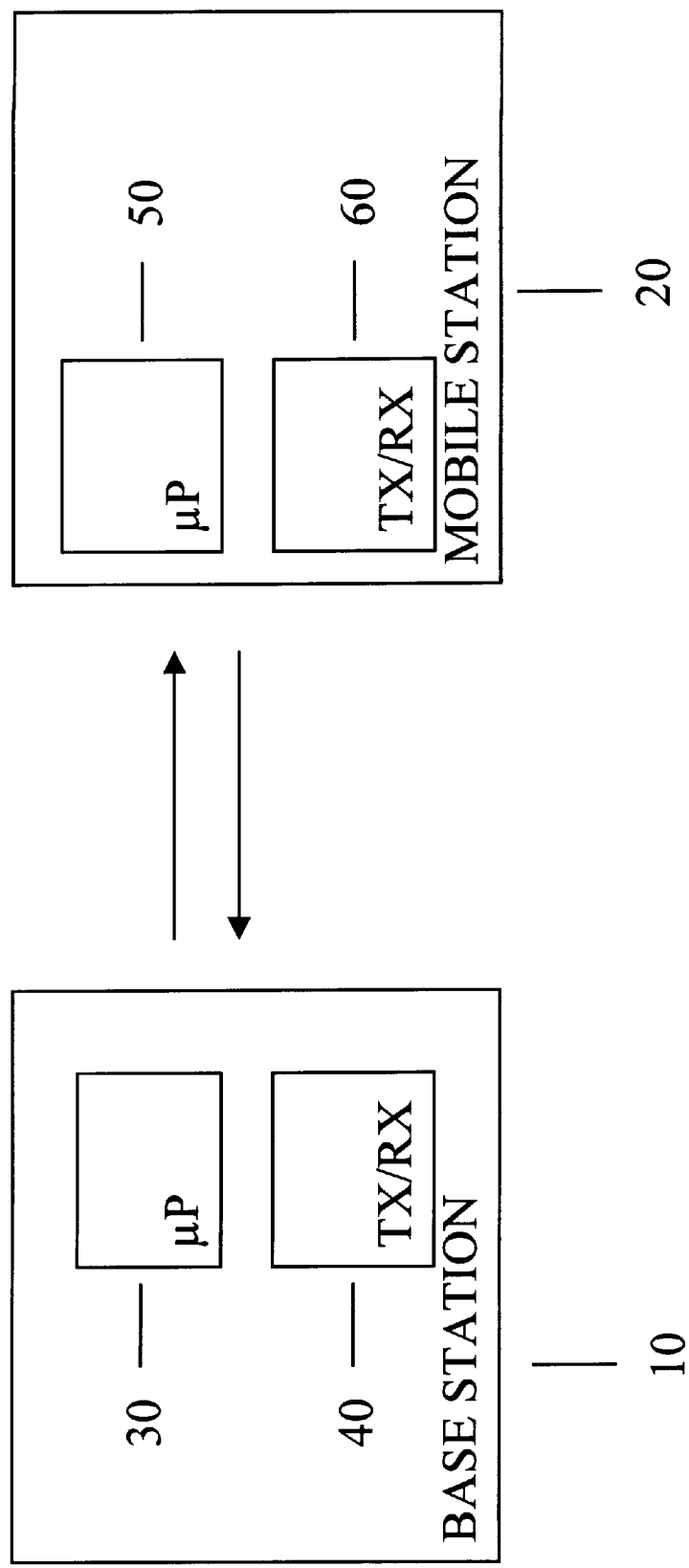
FIG. 1 depicts a block diagram of a CDMA system in accordance with the present invention including a base station and a mobile station.

Call processing refers to the technique of message flow protocols between a mobile station 20 and a base station 10. Call processing can be classified into two parts, mobile station call processing and base station call processing. The present invention as depicted in FIG. 1 is directed to the mobile station call processing, but may also be applicable to base station call processing without departing from the spirit of the invention.

According to TIA/EIA/IS-95, during call processing a mobile station 20 enters four basic states: Mobile Station Initialization, Mobile Station Idle, System Access and Mobile Station Control on the Traffic Channel. In Mobile Station Initialization the mobile station may select and acquire a system. During Mobile Station Idle the mobile station may monitor messages on the paging channel. In System Access the mobile station may send messages to the base station on the access channel. Finally, during Mobile Station Control on the Traffic Channel the mobile station may communicate with the base station using the forward and reverse traffic channels. The following discussion will focus on the System Access State.

The System Access State includes six substates: Update Overhead Information, Mobile Station Origination Attempt, Page Response, Mobile Station Order/Message Response, Registration Access, and Mobile Station Message Transmission. When a mobile station is directed by the user to initiate a call, the mobile station origination operation is performed. In the Mobile Station Origination Attempt substate the mobile station sends an origination message to the base station 10.

When the base station 10 initiates a call to the mobile station 20 it sends a page message. The mobile station 20 receives the page message, and searches the message to determine if it contains the mobile station's identification number (MIN). If it does, the mobile station 20 transmits a page response message to the page message on the access channel.

A way in which the present invention determines if the page message is directed to a particular mobile station 20 is by comparing the mobile station's MIN with the MIN in each record of the page message. If both MIN1 and MIN2 are present in a record, and both MIN1 and MIN2 match MIN1 and MIN2 for the mobile station 20, then a page match is declared. (in this embodiment MIN1 represents the 24-bit identification number which corresponds to the 7-digit directory telephone number assigned to the mobile station, and MIN2 represents the 10-bit identification number which corresponds to the 3-digit area code assigned to a mobile station 20, although they could represent other types of identification numbers without departing from the scope of the present invention and there could be only one MIN or more than two MIN's as well). If MIN1 is present in a record but MIN2 is not, and MIN1 matches MIN1 and a nonroaming (SID, NID) pair matches the SID and NID of the base station 10, then a page match is also declared. Any other combination is considered a mismatch and the message is ignored. If a page match is declared, and the mobile station 20 is configured to receive mobile station terminated calls in its present roaming status, the mobile station 20 enters the update overhead information substate of the system access state with a page response indication after the page message is received. If the mobile station 20 is not configured to receive mobile station terminated calls in its present roaming status, the mobile station 20 ignores the record.

FIG. 2. illustrates the fields which may be added to the origination message and/or the page response message. Those skilled in the art will recognize that these fields may be additional fields to the main message or one or more of the fields may be subrecords of another field. In FIG. 2, NUM_ALT_SERVICE_OPTIONS represents the number of alternate service options of the same type (i.e. voice, data etc.) supported by the mobile station 20 other than the service option specified in the PREFERRED_SERVICE_OPTION (currently referred to only as SERVICE_OPTION). Those skilled in the art will recognize that this NUM_ALT_SERVICE_OPTIONS number may also be designed to include the preferred service option and/or service options other than the type specified in the PREFERRED_SERVICE_OPTION. If the mobile station does not support any alternate service options this field may be set to zero or omitted or it may be set to one for the preferred service option. ALT_SERVICE_OPTION represents the service options, of the same type as the preferred service option, supported by the mobile station 20, other than the preferred service option. Those skilled in the art will recognize that this ALT_SERVICE_OPTION may also include the preferred service option and/or additional service options of different types. If the mobile station 20 does not support any alternate service options then this field may be omitted or it may simply duplicate the PREFERRED_SERVICE_OPTION field. Those skilled in the art will recognize that while it may be omitted it is not required to be omitted. Instead, it could be assigned some predetermined value which represents that there are no additional service options supported.

FIG. 1 illustrates a system for implementing the present invention. As seen from FIG. 1, the system includes a base station 10 and a mobile station 20. The base station 10 may include microprocessor 30 for generating, or routing from a different station, a page message for the mobile station 20. (While a microprocessor is illustrated, those skilled in the art will recognize that other similar devices could be employed such as ASICs or the like). The base station 10 may also include a transmitter 40 (or transceiver 40) which transmits the page message to the mobile station 20. Mobile station 20 may include a receiver 60 (or transceiver 6) which receives the page message from the base station 10. It may also include a microprocessor 50 or the like which evaluates the page message to determine if the message is intended for the mobile station 20. If microprocessor 50 determines that it is, microprocessor 50 may generate a page response message which includes a field having the preferred service option and another field having all service options of the preferred option type supported by the mobile station 20. The transceiver 60 (or transmitter 60) then transmits this page response message back to the base station 10.

It will thus be seen that the invention efficiently attains the objects set forth above, among those made apparent from the preceding description. In particular, the invention provides systems and methods of negotiating service options between a base station and a mobile station in a CDMA system which eliminates the need for request and response negotiations between the base station and a mobile station to determine which service options are acceptable to both. Those skilled in the art will appreciate that the configurations depicted in FIGS. 1–2 reduce the time and number of communications required to initiate a call in a CDMA system.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. In a wireless communication system, a method of initiating calls between a mobile station and a base station wherein status request messages and status response messages are not required for the base station to determine alternate service options supported by the mobile station comprising:
   said mobile station generating an origination message including:
      a field including a preferred service option supported by said mobile station; and,
      another field including at least one service option supported by said mobile station; and,
   said mobile station transmitting said origination message to said base station.

2. The method of initiating calls according to claim 1 wherein said origination message further includes a field including a number representing said at least one service option.

3. The method of initiating calls according to claim 1 wherein said at least one service option does not include said preferred service option.

4. The method of initiating calls according to claim 1 wherein said at least one service option includes said preferred service option.

5. In a wireless communication system, a method of initiating calls between a mobile station and a base station wherein status request messages and status response messages are not required for the base station to determine alternative service options supported by the mobile station comprising:
   said base station sending a page message to said mobile station;
   said mobile station determining whether said page message is intended for said mobile station;
   said mobile station transmitting a page response message to said base station if said mobile station determines that said page message is intended for said mobile station and if said mobile station is configured to receive mobile station terminated calls;
   wherein said page response message includes:
      a field for a preferred service option supported by said mobile station; and,
      another field for at least one service option supported by said mobile station.

6. The method of initiating calls according to claim 5 wherein said page response message further includes a field including a number representing said at least one service option.

7. The method of initiating calls according to claim 4 wherein said another field includes said preferred service option.

8. The method of initiating calls according to claim 4 wherein said another field does not include said preferred service option.

9. A wireless communication system configured to initiate calls between a mobile station and a base station wherein status request messages and status response messages are not required for the base station to determine alternative service options supported by the mobile station comprising:
   means for generating an origination message including:
      a field including a preferred service option; and,
      another field including at least one service option supported by said mobile station; and,
   at least one transmitter for transmitting an origination message generated by said message generating means.

10. The system of initiating calls according to claim 9 wherein said at least one service option includes said preferred service option.

11. The system of initiating calls according to claim 9 wherein said at least one service option does not include said preferred service option.

12. A wireless communication system configured to initiate calls between a mobile station and a base station wherein status request messages and status response messages are not required for the base station to determine alternative service options supported by the mobile station comprising:
   means associated with said base station for generating a page message;
   a transmitter associated with said base station, coupled to said page message generating means and configured to transmit said page message;
   a receiver associated with said mobile station and configured to receive said page message;
   means for determining if said page message is intended for said mobile station;
   means for generating a page response message; said page response generating means configured to generate said page response message only if said determining means determines that said page message is intended for said mobile station;
   wherein said page response message includes:
      a field including a preferred service option; and,
      another field including at least one service option supported by said mobile station; and,
   a transmitter coupled to said page response generating means and configured to transmit said page response message.

13. The system of initiating calls according to claim 12 wherein said at least one service option includes said preferred service option.

14. The system of initiating calls according to claim 12 wherein said at least one service option does not include said preferred service option.

15. A wireless communication system configured to initiate calls between a mobile station and a base station wherein status request messages and status response messages are not required for the base station to determine alternative service options supported by the mobile station comprising:
- a microprocessor associated with said base station and configured to generate a page message;
- a transmitter associated with said base station, coupled to said microprocessor and configured to transmit said page message;
- a receiver associated with said mobile station and configured to receive said page message;
- a microprocessor associated with said mobile station, coupled to said receiver and configured to determine if said page message is intended for said mobile station;
- said microprocessor further configured to generate a page response message if it determines that said page message is intended for said base station;
- wherein said page response message includes:
  - a field including a preferred service option; and,
  - another field including at least one service option supported by said mobile station; and,
- a transmitter associated with said mobile station, coupled to said microprocessor and configured to transmit said page response message.

16. The system of initiating calls according to claim 15 wherein said at least one service option includes said preferred service option.

17. The system of initiating calls according to claim 15 wherein said at least one service option does not include said preferred service option.

* * * * *